April 19, 1927. R. V. JUDSON Re. 16,600

PORTABLE APPARATUS FOR CLEANING AND GRADING GRAIN, SEED, AND THE LIKE

Original Filed March 12, 1921 2 Sheets-Sheet 1

Inventor:
Russell V. Judson,
by Burton & Burton
his Attys.

Witness:

April 19, 1927. R. V. JUDSON Re. 16,600

PORTABLE APPARATUS FOR CLEANING AND GRADING GRAIN, SEED, AND THE LIKE

Original Filed March 12, 1921 2 Sheets-Sheet 2

Inventor;
Russell V. Judson,
by Bunton & Bunton
his Attys

Witness:
C. E. Hunter

Reissued Apr. 19, 1927. Re. 16,600

UNITED STATES PATENT OFFICE.

RUSSELL V. JUDSON, OF DETROIT, MICHIGAN.

PORTABLE APPARATUS FOR CLEANING AND GRADING GRAIN, SEED, AND THE LIKE.

Original No. 1,[illegible], dated January 13, 1925, Serial No. 451,666, filed March 12, 1921. Application for reissue filed January 11, 1927. Serial No. 160,513.

The purpose of this invention is to provide a portable outfit for cleaning and sorting or grading grain,—the apparatus shown being especially designed to handle beans. It consists of certain features and elements of construction and in the combination of parts hereinafter described and shown in the drawings as indicated by the claims.

In the drawings:—

In accordance with the present practice the bean grower or farmer harvests his crop by cutting the vines and then passing them through a threshing machine designed to separate most of the stalk and leaf material from the beans themselves. The output of the thresher however contains considerable dirt, some chaff and a varying proportion of beans not suitable for market at the highest price because of roughness or irregularity in shape. This mixture of beans and dirt must therefore be further treated and ordinarily such additional cleaning and sorting is carried on at a storage elevator and the farmer is charged back for the work of cleaning and sorting his particular lot of beans in accordance with the weight of refuse material culled therefrom. He must first load the output of the thresher into sacks and then transport it, usually several miles, to the elevator where the sacks are dumped into bins or hoppers leading to the various mechanical devices for cleaning the beans. The final sorting or "picking" as it is called, may be done by hand or by means of machinery such as a centrifugal picker of the type shown in my pending application, Serial No. 393,385. After the sorting or grading operation the beans are again bagged and stored or shipped for final marketing.

To secure to the grower a larger proportion of the profit to be made from his crop to give him an opportunity to market his final product where he can secure the best price for it instead of being necessarily limited to the particular bean elevator in his vicinity, the present invention provides a portable outfit which can be taken to the grower's premises and which includes apparatus designed to accomplish the same work as that which is usually located in the bean elevator.

Figure 1:
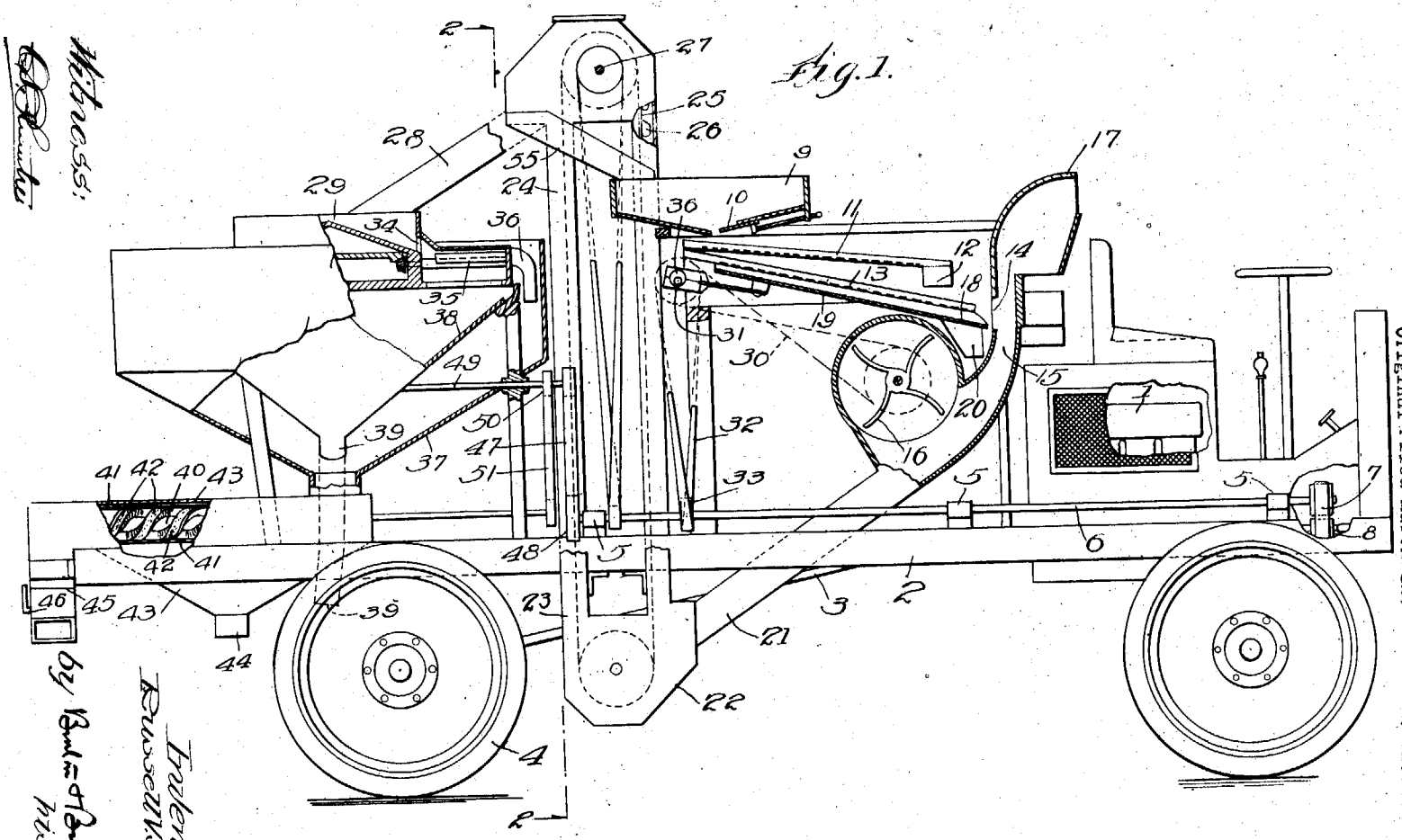
Figure 1 is a side elevation partly in section showing a vehicle carrying a power plant and machinery adapted to be driven thereby for cleaning and sorting grain in accordance with this invention.

The apparatus may be mounted upon a motor truck, a trailer, or a horse-drawn vehicle as desired but as illustrated in Figure 1, I have chosen to show the vehicle as a motor truck of a familiar type having an internal combustion engine, 1, carried at the forward end of its frame, 2, and adapted to drive the vehicle through the usual propeller shaft, 3, extending to suitable gearing associated with the rear wheels, 4. Journaled in brackets, 5, which are secured to the frame, 2, is a power member, shown as a counter-shaft, 6, adapted to be driven by a belt, 7, from a pulley, 8, on the forward end of the crank shaft of the engine, 1. From this counter-shaft, 6, it is therefore possible to secure power for driving the machinery carried by the truck for cleaning and sorting the beans. It may be understood that the pulley, 8, may be operatively connected with the crank shaft of the engine, 1, through any form of disengageable clutch, not shown, or when the vehicle is traveling and it is not desired to run the cleaning machinery the belt, 7, may be simply slipped off from the pulley, 8, so as to disconnect the countershaft entirely from the engine. Obviously if the vehicle is of the horse-drawn type instead of being self propelled, it will still be necessary to provide an engine carried on the vehicle frame for driving the machinery thereon or at least to provide a power pulley from which power may be derived from some other prime mover stationed adjacent the vehicle. Such an arrangement would be a simple and obvious modification of that shown in Figure 1 and specific illustration of it is deemed unnecessary.

Just back of the engine, 1, there is mounted on the frame, 2, a cleaning machine comprising a receiving hopper, 9, having a gate or valve, 10, controlling the flow of beans therefrom to the inclined screen, 11, directly below. The screen, 11, is sufficiently coarse to permit the good stock to pass through it while the coarse tailing and straw travel by gravity over the screen and are carried off through a spout, 12, discharging at one side of the vehicle. A second screen, 13, below the first receives the material for further grading and sifting. This is a fine screen permitting sand and dust to pass through it but allowing the good beans merely to roll down it toward an opening, 14, in a vertical air shaft, 15, leading from a fan or blower, 16, to a discharge hood, 17. The heavy sand and dust eliminated by the screen, 13, falls through a port, 18, of the inclined chute, 19, and discharges through a spout, 20. The dust remaining with the beans and entering the opening, 14, tends to be carried away in the air blast passing out through the hood, 17, while the beans themselves, being much heavier, travel downwardly in the air shaft, 15, by way of a chute, 21, and are conducted into a boot, 22, of an elevator, 23, mounted at one side of the frame, 2. In Figure 1 only the lower portion of this elevator is shown but it may be understood to be of the same familiar construction as the elevator, 24, mounted at the opposite side of the frame, 2, and seen in Figure 1 as consisting of an endless belt, 25, fitted with a series of cups or buckets, 26, which pick up the beans from the boot of the elevator at the lower limit of belt travel and discharge them as the belt traverses the head pulley. For convenience both elevators are connected together by a common drive shaft, 27, for their respective head pulleys. The beans discharged over the head pulley of the elevator, 23, are received in a chute, 28, which leads to the hopper, 29, of a centrifugal sorting or picking machine of the type above mentioned.

As indicated in Figure 1 the rotary fan or blower, 16, is driven by a belt, 30, from a shaft, 31, which in turn is driven by a belt, 32, traversing a pulley, 33, on the countershaft, 6. An eccentric, 36, on the shaft, 31, incidentally operates a vibrating device for the sand chute, 19, and screens, 11 and 13, of the cleaning machine.

In the picking machine the beans arriving in the hopper, 29, are fed outwardly therefrom through ports, 34, and are carried by centrifugal force radially downward across pairs of rubber-faced and co-operating rollers, 35, through which the rough beans or particles of dirt are passed by means of frictional engagement which the rollers exert upon them, while the smooth good beans are discharged through spouts, 36, leading from the outer ends of the rollers into a receiving hopper, 37. The principle of this type of machine is well understood and is more fully described in my said pending application, Serial No. 393,385. The culls and dirt removed by the picking rollers, 35, fall into a hopper, 38, and are discharged through a spout, 39, from which they may be collected if any further use is to be made of them.

The hopper, 37, discharges into a final cleaning device which consists of a rotating spirally grooved core of metal indicated at 40, journaled to revolve in a tubular casing, 41, of perforated sheet metal. The groove of the core, 40, is fitted with brush bristles, 42, so that as the beans are picked up by the spiral grooves at one end of the device and fed toward the other end as the core, 40, rotates, they are brushed and scoured by the bristles, 42, which thus remove practically all dirt or dust which may have adhered to the beans even through the other cleaning processes and this dust passes out through the perforations of the enclosing tube, 41, whence it is collected in a casing, 43, and discharged through a spout, 44, leading therefrom. The brushed beans arriving at the further end of the rotating core, 40, are discharged into a spout, 45, which is preferably of twin construction provided with a valve, 46, for directing the beans into one spout or the other for loading them into bags.

As will be seen from Figure 1, the centrifugal picking machine is driven by a belt, 47, connecting a pulley, 48, of the countershaft, 6, with a pulley on the shaft, 49, of said machine and an additional pulley, 50, on said shaft serves to drive the core, 40, of the brushing device through a belt, 51.

Figure 2:
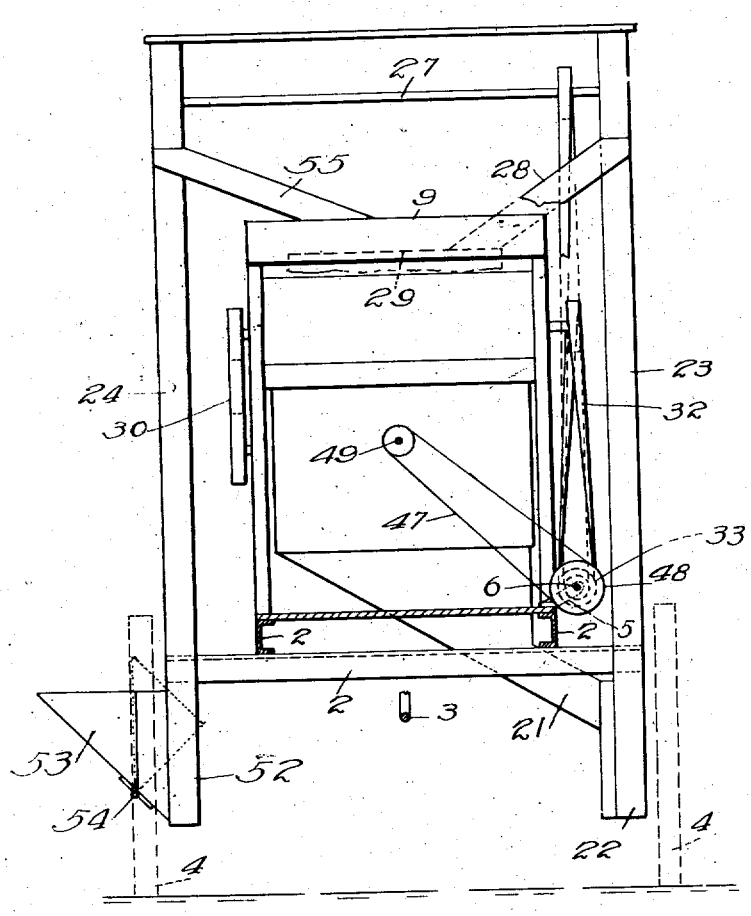
Figure 2 is a somewhat diagrammatic transverse section taken as indicated at line 2—2 on Figure 1.

To facilitate the loading of the beans into the receiving hopper, 9, the outfit may be provided with the elevator, 24, above mentioned. As shown in Figure 2, its receiving boot, 52, opens at the outer side where it is provided with a hopper, 53, into which the beans and dirt to be cleaned and sorted may be dumped from bags or fed directly from the bean threshing machine. Preferably this hopper, 53, is designed to collapse against the side of the boot, 52, by folding about a hinge, 54, so as to come within the lateral dimensions of the vehicle when the apparatus is being transported from place to place. From the upper end of the elevator, 24, the beans picked up by it are discharged to an inclined chute, 55, into the hopper, 9, of the cleaning machine.

I claim:—

1. In combination with a vehicle and a power member mounted thereon, apparatus mounted on said vehicle adapted to receive threshed grain and including mechanism for separating out chaff and dirt, mechanism for separating rough imperfect grain from smooth grain, and mechanism for polishing and cleaning the grain, means for conducting the grain from each mechanism to the next and driving connections from said power member adapted to operate all said apparatus simultaneously.

2. In combination with a vehicle and a power member mounted thereon, apparatus assembled on said vehicle including a fanning mill for cleaning grain, a picking or sorting machine for grain and a grain polishing machine together with conduits for leading the grain from each machine to the next and driving connections from said power member to said apparatus.

3. In the combination defined in claim 2, an elevator mounted on the vehicle with its receiving boot near the ground and provided with a discharge spout at its upper end arranged to feed material to the fanning mill.

4. In the combination defined in claim 2, an elevator mounted on said vehicle and a chute leading from the fanning mill to the receiving boot thereof, the upper end of said elevator being provided with a discharge spout arranged to feed material to the picking machine.

5. In the combination defined in claim 1, the polishing mechanism being arranged to receive material from the mechanism for separating the rough and smooth grain and being provided with a discharge spout conveniently near the ground for filling bags with the polished grain.

6. In combination with a vehicle and a power member mounted thereon, apparatus assembled on said vehicle including a fanning mill for cleaning grain and a grain sorting or picking machine, both having grain receiving hoppers at substantially the same level and both being arranged to discharge the grain downwardly by gravity, an elevator connected to receive material released by gravity from the fanning mill and carry it upward for discharge into the receiving hopper of the picking machine together with driving connections from said power member to said machines and elevator.

7. In the combination defined in claim 6, an additional elevator on the vehicle having its receiving chute adjacent the ground and a spout arranged to discharge into the receiving hopper of the fanning mill.

In testimony whereof, I have hereunto set my hand at Detroit, Mich., U. S. A., this 10th day of January, 1927.

RUSSELL V. JUDSON.